UNITED STATES PATENT OFFICE.

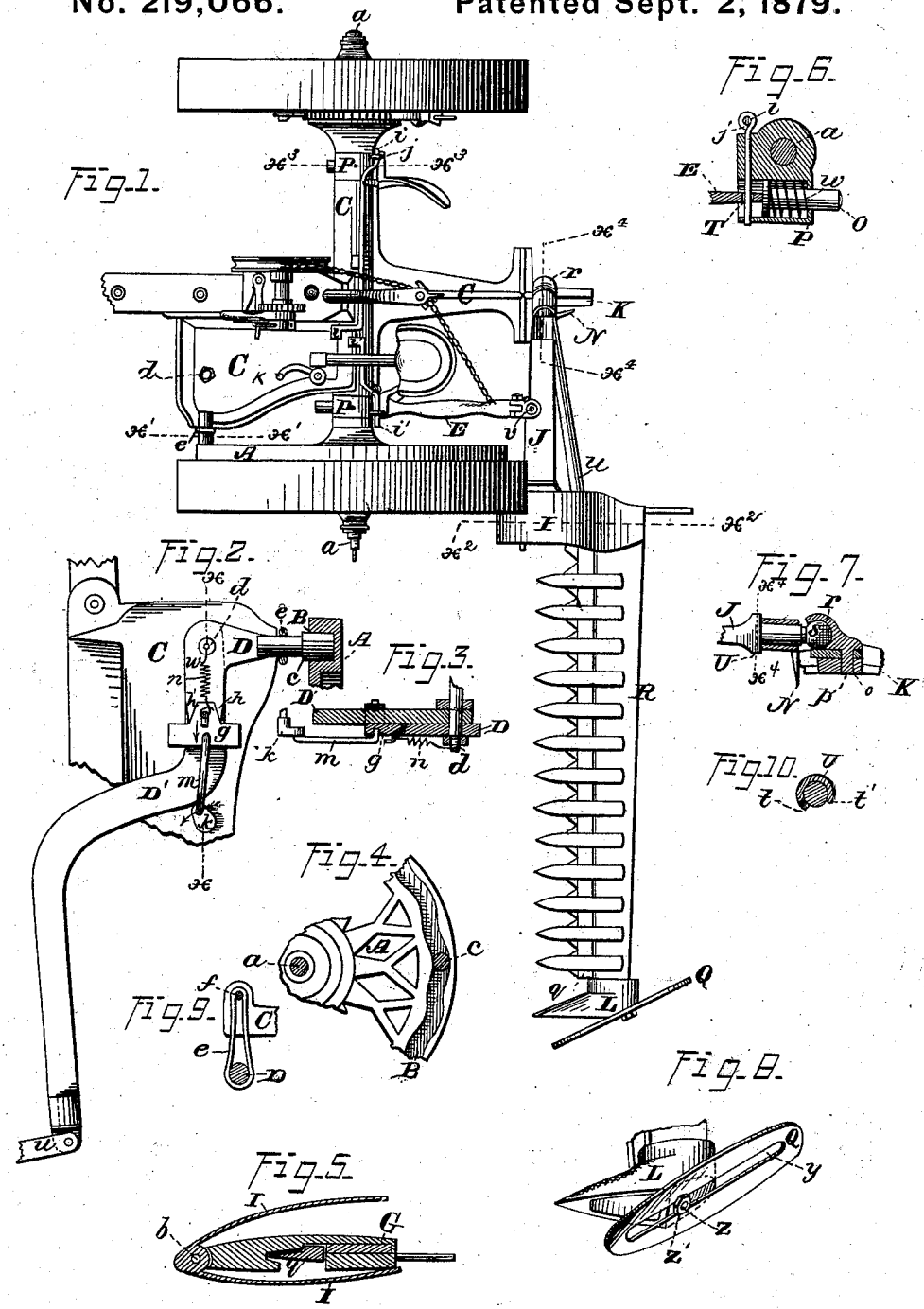

FRANK H. BRYAN, OF TROY, NEW YORK.

IMPROVEMENT IN MOWING-MACHINES.

Specification forming part of Letters Patent No. 219,066, dated September 2, 1879; application filed August 2, 1879.

*To all whom it may concern:*

Be it known that I, FRANK H. BRYAN, of the city of Troy, in the county of Rensselaer and State of New York, have invented a new and useful Improvement in Mowing-Machines, of which the following is a concise specification, reference being had to the accompanying drawings.

My invention consists in the combination of certain mechanical devices relating exclusively to grass-cutting machinery, with a peculiar mechanical device for transmitting motion; and I have so arranged my improvements, in combination with other old and well-known devices, as to constitute a simple, efficient, and reliable reversible mowing-machine, adapted to cutting continuously upon the same side of a grass-field, thereby keeping the severed grass all together, and for cutting lodged or tangled grass, side hills, and other places where it would be impracticable or inconvenient to go around the field.

It is designed to reverse my machine without at any time manipulating any part by hand, the change being fully accomplished by the pressure of the operator's foot upon a lever underneath the seat, thereby freeing the drag-brace E from the truck, and at the same time turning the horses attached thereto in the reverse direction.

Figure 1 is a plan of my invention. Fig. 2 is a plan of my device for transmitting motion, viewed from the under side of its supporting-frame, with a section of the wheel A, showing the roller $c$ in the groove B. Fig. 3 is a section of Fig. 2 on the line $x\ x$. Fig. 4 is a segment of the circular wheel A, showing the serpentine groove B in plan. Fig. 5 is a section of the inside shoe and its auxiliary shield on the line $x^2\ x^2$, Fig. 1. Fig. 6 is a section of the brace-holder P on the line $x^3\ x^3$, Fig. 1, showing the brace-holder, latch-pin, and pin-set in conjunction. Fig. 7 is a section of the tilting-lever N, swivel-bolt $p$, and portion of the frame on the line $x^4\ x^4$, Fig. 1, showing the relation of the coupling-bar J to the parts aforesaid. Fig. 8 is a perspective of the outside shoe, with the track-clearer pivoted thereto. Fig. 9 is a plan of the rocking collar supporting the lever-arm D under the frame C by a hook, $f$. Fig. 10 is a section of Fig. 7 on the line $x^4\ x^4$, showing the notched collar of the coupling-bar J.

To enable others to understand my invention, I will more fully describe its various parts and mechanical combinations.

That part of my invention which relates to a means of imparting motion consists of a circular disk or wheel, A, rigidly fixed upon a shaft, $a$, and supplied with a deep corrugated groove, B, Figs. 2 and 4, in one side or face thereof, near its outer rim. The shaft $a$ engages with and revolves in bearings in the frame C. Engaging with the groove B is an elbowed lever-arm, D, supplied with a roller, $c$, and pivoted near its elbow to the frame C by means of the bearing $d$, and is movably supported to the outer edge of said frame by a rocking collar, $e$, hung upon the hook $f$. The lever D', underlying the arm D, is pivoted to the frame by the bearing $d$, both arm and and lever being so engaged therewith that they may rock thereon, being rendered rigid one to the other by a collar, $g$, sliding upon the lever D' over the points $h$ and $h'$ of the lever-arm D, holding the two parts firmly together, so that they move in unison. To withdraw the collar $g$ from the arm D, so as to throw the lever D' out of motion, I use a crank-lever, $k$, and chain or its equivalent, $m$, which connects the crank and collar together. The opposite side of the collar is connected with a spiral spring, $n$, which is permanently attached to the pivot $d$.

It will be seen that whenever it is desired to throw the cutting mechanism out of motion it may be done by turning the crank $k$, Figs. 1 and 2, thereby withdrawing the collar $g$ sufficiently to allow the points $h$ and $h'$ to oscillate between the opposite rims of the collar $g$. The parts may be thrown into motion again by simply freeing the lever-crank $k$ and allowing the spring $n$ to draw the collar into place.

It will also be seen that whenever the shaft and wheel A revolve, the arm D will rock on its pivot, and its ends move reciprocally from side to side, as will also the free end of the lever D' when in rigidity with its arm D, thereby driving the sickle by the reciprocating movement of a simple fulcrum and lever engaged with it by a pitman-rod, $u$.

The frame C is constructed with an extension, K, and supplied with a bolt-hole, o, Fig. 7, wherein a swivel-bolt, p, engages. The head of the bolt p is constructed in two parts, supplied with a socket, r, for receiving and engaging a ball, s, at the end of the coupling-bar J, the opposite end whereof is jointed with the shoe G, and is supplied with a drag-brace, E, jointed thereto at v. It is also supplied with an automatic tilting-lever, N, having the shank of the coupling-bar as an axis, and moving by its own weight between the points t and t' of the notched collar U, which forms apart of the shank of the coupling-bar. The lever N, being supplied with a nib, engages the points t and t' of the collar alternately, and tilts and reverses the coupling-bar and cutting apparatus, at the will of the operator, as the truck turns to the opposite direction.

The drag-brace E is detachably connected with the truck by means of a latch-pin, j, Fig. 6, which may be raised from contact with it by means of a foot-lever, i or i'.

The frame or truck is supplied at either side with an automatic bulk-head or pin-set, O, and spring w, which rests in contact with the cavity of the receiver P and its bulk-head O, as shown.

The inside shoe, G, is supplied with a shield or auxiliary shoe, I, engaging it by an ordinary hinge, b, at the front end thereof, the function of which is to form a surfaced shoe next the ground at all times.

The outside shoe, L, is supplied with a track-clearer or grass-board, Q, supplied with a slot, y, extending longitudinally through its center nearly the entire length thereof, and is so pivoted, in connection with its shoe L, by a bolt and nut, Z and Z', as to allow the grass-board to turn thereon, which, being in contact with the ground, will remain stationary when the shoe moves forward, the pivot sliding to the forward end of the slot, thereby bringing the grass-board to its proper place at the rear of the cutter-bar whenever it takes the reverse direction.

It will be seen that whenever the latch-pin j is withdrawn from contact with the drag-brace E, and the truck is turned in an opposite direction, the brace E will be withdrawn from the receiver P, and the spring w will throw the bulk-head O forward under the point of the pin j', and hold the same in set ready to drop down through the hole T, near the end of the brace E, whereby the same will be securely locked to the truck whenever the brace shall be thrust forward against the set O sufficiently to displace it from under the pin.

It will also be seen (see Fig. 1) that, whenever the drag-brace E is unlatched and the truck turned in the reverse direction, the lever N will be brought in contact with the frame-extension K, and as the coupling-bar J passes over it in the progress of turning the truck the cutter-bar R will be raised upright upon the heel of the shoe G and turned over to the reverse position.

Having thus fully described my invention, I claim as new, and desire to secure by Letters Patent—

1. The combination of the grooved wheel A with the lever-arm D and lever D', substantially as and for the purposes set forth.

2. The combination of the pivoted elbow-lever arm D and stirrup e, supporting it, when the stirrup is placed adjacent to the face of the cam-grooved driving-wheel, so as to support and preserve the end of the lever in proper working relation with the cam, substantially as described.

3. The combination of the sliding collar g with the lever D' and arm D, substantially as and for the purposes set forth.

4. The swivel-bolt, having its head constructed in two parts and supplied with a ball-socket, in combination with a frame and ball-shanked coupling-bar, substantially as and for the purposes described.

5. The combination of the double auxiliary shoe or shield with the main shoe, substantially as described.

6. The grass-board Q, supplied with a central longitudinal slot, y, in combination with and pivoted to the shoe L, substantially as shown and described.

FRANK H. BRYAN.

Witnesses:
GEO. M. LOCKWOOD.
JNO. H. SMALLWOOD.